United States Patent Office 3,302,680
Patented Feb. 7, 1967

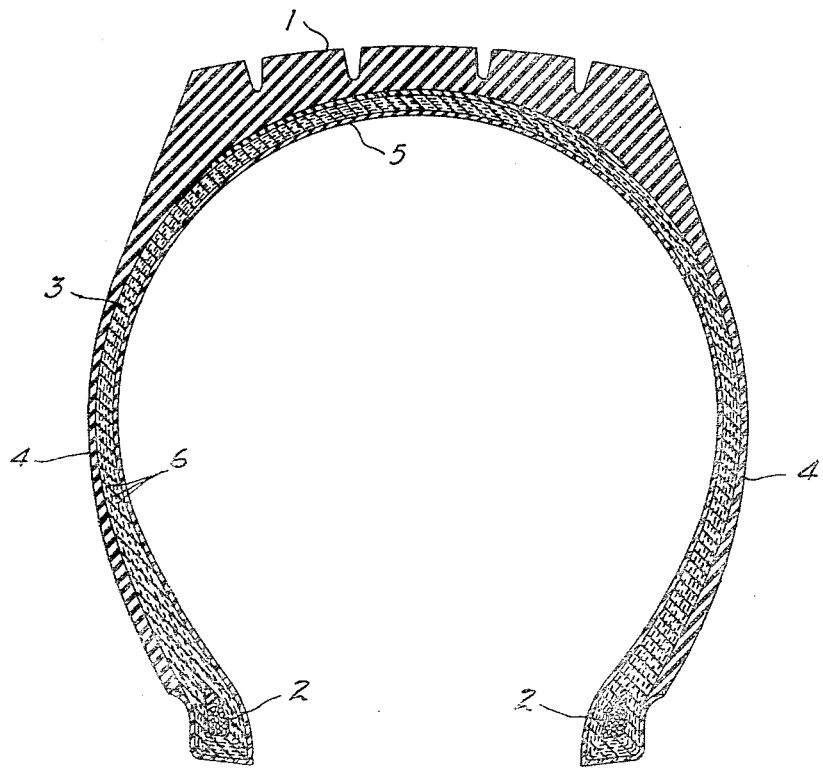
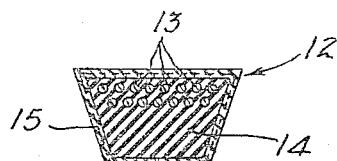
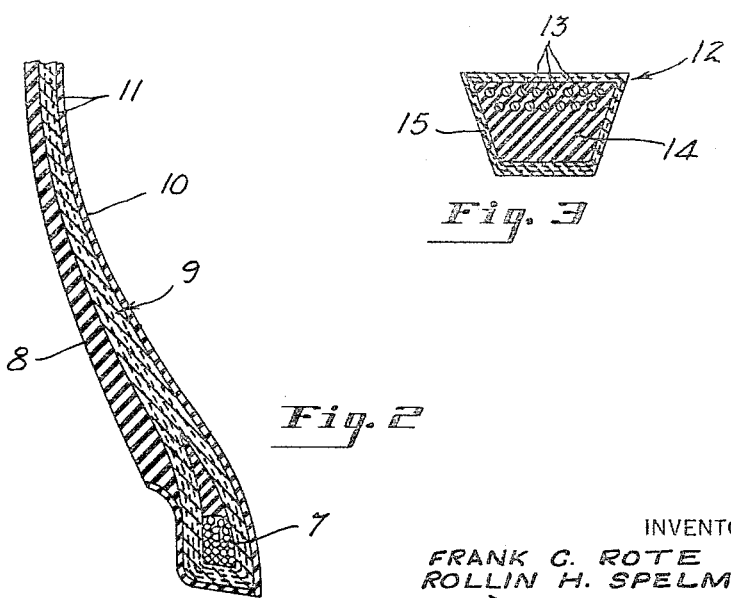

3,302,680
LOW MOISTURE CONTENT PNEUMATIC TIRE CARCASS RUBBERIZED LAMINATES AND VULCANIZABLE RUBBERY POLYMERS USED THEREIN
Frank C. Rote and Rollin H. Spelman, Akron, Ohio, assignors to The General Tire & Rubber Company, Akron, Ohio, a corporation of Ohio
Filed July 30, 1964, Ser. No. 387,548
17 Claims. (Cl. 152—357)

This application is a continuation-in-part of United States Patent application Serial No. 334,271, filed December 30, 1963. The invention relates to laminates including pneumatic tires and more particularly to rubber compositions having a low moisture content and to a method of making rubberized laminates and tires having a carcass portion formed of one or more superposed plies of rubber-coated fabric. The invention provides an improved means for establishing a moisture barrier to prevent the accumulation of moisture around the fabric material and thus substantially reduces the flatspotting tendency heretofore inherent, particularly in nylon and polyolefin cord tires.

The use of polyolefin textile fibers for tire cord is relatively new but nevertheless quite promising because of their high melting point and high tensile strength. Polyolefin fibers suitable for this purpose include poly-3-methylbutene-1; poly-4-methylpentene-1; poly-3,3-dimethylbutene-1; polyethylene; polypropylene; and the like and mixtures thereof.

Pneumatic tires having a nylon or polyolefin cord carcass construction are in many ways superior to tires utilizing other types of fabric material. However, tires reinforced with nylon or polyolefin cord are not as widely used as their advantages would suggest due to their undesirable characteristic, commonly known as flatspotting. Flatspotting is most apparent when a tire, which has been heated during use to normal operating temperature, cools down to unusually low temperatures and it is characterized by a local stiffening or shrinking of the fabric plies at the portion of the tire which has been flattened by the weight of a vehicle pressing the tire against the ground. This stiffness in a distorted condition persists for a certain time after the vehicle is again put into operation, and an audible thump or hum continues until the tire is reheated to normal operating temperature. This undesirable characteristic has been attributed at least in part to the viscoelastic properties, such as low dimensional stability and low modulus of elasticity, of certain types of textile fibers such as nylon and polyolefin.

Flatspotting may be partially eliminated by carefully controlling the amount of moisture which may be absorbed by the rubber and cord material before or during manufacture of the tire. The accumulation of moisture in nylon cord has been prevented both by drying the material at various stages of the manufacturing process and by adding a desiccant, such as calcium oxide, during the compounding of the ply stock used to coat the fabric. Techniques such as this are described in Belgian Patent No. 626,919, which was issued on January 8, 1963, in the name of E. I. du Pont de Nemours and Company. This patent describes methods which may be used to keep the moisture content of the cords lower than 1% by weight in order to hold the flatspotting characteristic within an acceptable lower magnitude. For example, this patent shows that this may be achieved by special drying techniques designed to provide greater dehydration of the plies during the vulcanization process. The patent also discloses another technique for providing a moisture barrier in which a suspension of calcium oxide in oil is dispersed in the ply stock composition prior to its application in the form of a coating or layer on the cords.

While these techniques provide for reduced flatspotting, they do not provide a suitable practicable solution adaptable for commercial use. The manufacture of tires in a controlled dry atmosphere to prevent moisture from accumulating on or in the cord material would be too costly. The dispersing of calcium oxide in an oil suspension in the tread stock composition subsequently used to coat the nylon or polyolefin cords is effective to provide a moisture barrier but is unsuitable because the presence of the calcium oxide results in deterioration of cord adhesion, retardation of the cure rate and a reduced modulus and tensile strength of the ply stock rubber, all of which decrease the over-all durability of the finished tire.

The present invention provides an improved ply stock composition containing a desiccant, such as calcium oxide, wherein the undesirable effects of the desiccant in the rubber are substantially reduced. The improvement consists in the use of an amphoteric material such as alumina together with a desiccant such as CaO. The use of such amphoteric material unexpectedly restores the cure rate, raises the modulus and prevents the deterioration of cord adhesion normally caused by the desiccant.

It is among the objects of the present invention to provide a rubberized nylon or polyolefin laminate such as a cord-reinforced pneumatic tire, with substantially reduced flatspotting characteristics.

Another object of the present invention is to provide a ply stock composition for use as a coating on nylon or polyolefin fabric which provides a moisture barrier around the cords.

It is another object of this invention to provide a method of making rubberized nylon and polyolefin laminates such as pneumatic tires in which a desiccant is dispersed in the rubber surrounding the nylon or polyolefin cords and which possesses the desired characteristics of high cord adhesion, high cure rate, and high modulus, tensile strength and durability.

It is a further object of the present invention to provide means for reducing the undesirable effects of desiccants such as calcium oxide when used in a ply stock composition for rubberizing tire cords and other laminates.

Other objects, uses and advantages of this invention will become apparent from the following detailed description and accompanying drawings in which:

FIGURE 1 is a transverse sectional view of a tubeless pneumatic tire having four layers of cords embedded in the tire carcass;

FIGURE 2 is a fragmentary transverse sectional view of a tubeless pneumatic tire having two layers of cords embedded in the tire carcass; and FIGURE 3 is a transverse sectional view of a V-belt formed of rubber-coated cords.

Referring more particularly to the drawings, FIGURE 1 shows a tubeless pneumatic tire embodying the present invention wherein four layers of textile cords embedded in the tire carcass are surrounded by rubber of a suitable ply stock composition having dispersed therein a desiccant, such as calcium oxide, and an amphoteric material, such as alumina. The tire comprises generally a tread portion 1, inextensible beads 2, a rubberized nylon or polyolefin carcass portion 3, side walls 4, and an inner liner 5 adhered across the open interior surface of the tire from bead to bead.

The carcass portion 3 is made up of a plurality of plies of tire cord fabric, each of which consists of a layer of nylon or polyolefin textile cords 6 embedded in rubber. Prior to embedding each individual nylon or polyolefin layer in the rubber ply stock (which may be accomplished by any of the methods commonly utilized in the production of rubberized tire cord fabric), a quantity of calcium oxide is dispersed in the ply stock composition together with a quantity of alumina, both to provide a moisture barrier around the cords and to substantially reduce the undesirable effects commonly attributed to calcium oxide dispersed in rubber.

A quantity of calcium oxide may also be dispersed in the rubber composition used for the inner liner 5. The amount is preferably about 2 to 15 parts per 100 parts of rubber. Normally, a halogenated butyl rubber is used for the inner liner, such as chlorinated butyl rubber, but other rubbers or mixtures thereof can be used. Butyl rubber comprises a copolymer of from about 0.5 to 5% isoprene and from about 99.5 to 95% of isobutylene. Because the primary function of the inner liner is to provide an impervious layer for retaining compressed air within the inflatable tire when mounted on a vehicle wheel, it is not as important that the alumina be added because the cure rate, modulus and tensile strength of the inner liner are not critical. Alumina may, of course, be added to butyl rubber compounds along with CaO if desired to obtain benefits of the present invention.

FIGURE 2 shows a portion of a tubeless pneumatic tire having two layers of nylon or polyolefin textile cords embedded in the rubber of the carcass portion. The portion of the 2-ply tire shown includes an inextensible bead 7, a side wall 8, a carcass portion 9 and an inner liner 10. This illustrates an embodiment of the invention wherein the desiccant is dispersed in the inner liner as well as in the ply stock rubber used to coat the two layers of nylon or polyolefin fabric 11. This provides a more effective moisture barrier, as the calcium oxide in the inner liner is effective to absorb moisture which may accumulate on the interior walls during both manufacture and normal operation of the tire.

FIGURE 3 illustrates how the invention can be applied to a V-belt 12 of the conventional type having parallel nylon or polyolefin textile cords 13 embedded in a main body portion 14 of trapezoidal cross section and a rubberized fabric cover layer 15 surrounding the portion 14. The portion 14 is formed of a rubber composition embodying the present invention.

The ply stock composition in which the cords are embedded is normally a synthetic rubbery polymer or a mixture of natural rubber and a synthetic rubbery polymer. Varying quantities of polybutadienes, such as cispolybutadiene or cispolyisoprene, may also be added to the ply stock composition along with varying quantities of oil.

The synthetic rubbery polymers used in the process of this invention are generally homopolymers of conjugated diolefins or copolymers of a major proportion of a diolefin such as butadiene-1,3; isoprene; dimethyl butadiene or the like, preferably with one or more vinyl aromatic hydrocarbons or substituted vinyl aromatic hydrocarbons, such as styrene, alkylstyrene, especially alpha-methyl styrene, nuclear substituted styrenes, especially vinyl toluene and chloro styrenes, and certain acrylic monomeric compounds such as methyl methacrylate and the like. These synthetic rubbery polymers are preferably sulfur vulcanizable and are preferably compatible with hydrocarbon oils. The non-oil-resistant rubbers are usually preferred, although rubbery polymers prepared from alkylene oxides, including rubbery copolymers of propylene oxide with a relatively small proportion of a diolefin monoxide such as allyl glycidyl ether, etc., are also usable.

In the accompanying claims the term polymer is used in a generic sense to include copolymers as well as homopolymers.

Varying quantities of carbon black, zinc oxide and stearic acid together with accelerators and antioxidants are normally added to the ply stock during the compounding of the rubber material. The ply stock material is initially compounded in a Banbury mixer or other internal mixer during a mixing stage where the rubber is generally subjected to a temperature above 250° F. This is sufficient to provide substantial dehydration of the material as disclosed, for example, in the application of A. J. Beber et al., Serial No. 246,911, filed December 26, 1962. Varying amounts of oil or other rubber compounding ingredients may also be added to the Banbury mixer or on the mill and dispersed throughout the composition. The oil may be incorporated in the rubber while it is in the form of latex, or prior to mixing in the Banbury. Such mixing is shown, for example, in U.S. Patents Nos. 2,972,774 and 1,881,994.

The carbon black and oil, with or without zinc oxide, are preferably mixed in a first Banbury pass. The composition is later passed through one or more additional Banbury mixing stages wherein sulfur and varying quantities of suitable accelerators are added. It is at this later stage or stages, after the dehydration caused by the higher temperature in the first mixing stage, that the ingredients are added in accordance with the present invention. The calcium oxide desiccant is preferably added in the form of finely divided particles suspended in mineral or other oil compatible with the rubber used. The proportions are not especially critical; however a mixture of 3 parts by weight of calcium oxide to 1 part of mineral oil is suitable for this purpose. In place of mineral oil, synthetic oils can be used. Also in accordance with the present invention, alumina is added in sufficient amounts to counteract the undesirable effects of the desiccant.

Where, for example, the calcium oxide is added in the form of a suspension of 3 parts of CaO to 1 part oil, the amount used should be about 3 to 16 parts by weight of the suspension per 100 parts of rubber polymers. If the CaO is added in any other form, the amount used should be about 2 to 12 parts by weight of CaO per 100 parts by weight of rubber and preferably about 5 to 10 parts by weight of CaO. The amount of $Al_2O_3$ preferably should be about twice the amount of CaO in order to effectively counteract the undesirable effects of the CaO on the ply stock. Thus, about 3 to 25 parts by weight of $Al_2O_3$ per 100 parts by weight of rubber are generally used, and preferably about 10 to 20 parts by weight of $Al_2O_3$ depending, of course, on the amount of CaO.

The invention will be better understood by reference to the following illustrative example.

EXAMPLE

A ply stock composition was prepared according to the formulation of Table I below.

*Table I*

| Material: | Parts by weight |
|---|---|
| Natural rubber | 50 |
| SBR 1502 (a copolymer of about 72 parts butadiene and 28 parts styrene polymerized at about 41° F. and having a Mooney viscosity of about 150 ML–4 at 212° F.) | 50 |
| Philblack O (a fine reinforcing furnace carbon black) | 35 |
| Circosol 2XH7 (a naphthalenic type hydrocarbon oil containing some aromatic oil) | 50 |
| Zince oxide | 10 |
| Stearic acid | 1 |
| Antioxidant (Agerite Spar) | 1 |
| Picco 100 (para coumarone-indene resin) | 2 |
| Caloxol (a suspension of 75% CaO in mineral oil) | 10 |
| Aluminum oxide ($Al_2O_3$) | 15 |
| Altax (a benzothiazyl disulfide accelerator) | 0.3 |
| Nobs Special (N-oxydiethylene benzothiazole-2-sulfenamide) | 1.25 |
| Oiled sulphur (80% sulphur in oil) | 3.25 |

In the above table, Agerite Spar is a styrenated phenol having the general formula

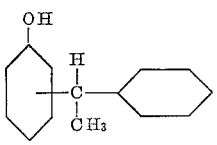

The rubber, oil and carbon black together with the ZnO, stearic acid, Agerite Spar and Picco 100 resin are mixed for 4 to 5 minutes in a high speed Banbury mixer at a maximum temperature of around 350° F. so as to cause considerable dehydration of the materials, after which the product is dumped, sheeted and cooled.

The product is then mixed together with the above quantities of Caloxol and $Al_2O_3$ in a high speed Banbury mixer at a maximum temperature of around 275° F., after which the product is again sheeted and cooled.

Finally the product is mixed at a third Banbury stage with the above quantities of Altax, Nobs Special and oiled sulphur at a maximum temperature of around 220° F.

The carcass or ply compound thus produced is calendered onto a layer of conventional nylon tire cords which have been previously dipped in or coated with a suitable cord adhesive (such as an aqueous composition of a resorcinol-formaldehyde resin and a butadiene-styrene vinyl-pyridine copolymer latex) and dried and hot-stretched as is customary in the art.

The resulting rubberized fabric is applied to a tire building drum over a butyl rubber inner liner layer to form four plies. Then extruded SBR rubber tread stock is applied over the plies and the building of the uncured tire completed. The tire thus formed is shaped and vulcanized in the usual manner to provide a tire as shown in FIGURE 1.

A tire made in this manner has excellent physical properties indicating that there is no substantial reduction in the quality of the rubber as has previously been the case when using calcium oxide. The advantage of reduced flat-spotting is thus obtained without sacrificing the quality of the rubber in the tire.

In the above example, the rubber polymers may be replaced with other conventional SBR rubber polymers or mixtures of SBR and natural rubbers. Various types of reinforcing carbon blacks may also be used as well as various conventional plasticizers and tackifying resins. The type of curing agent employed is not critical, and various curing systems commonly used in the making of tires may be used. Thus, the type of sulfur-bearing material and the type of accelerator may be varied widely as will be apparent to those skilled in the art.

When building tires by the process of this invention, the compositions and procedures may be generally those described in prior art patents such as U.S. Patent No. 2,932,901, U.S. Patent No. 2,561,215, and Canadian Patent No. 582, 885. Thus, the tire adhesives and tread rubber compositions may be of the type described in those patents. The tire building procedures may also be as described in those patents; however various other conventional procedures may be used. The flat-band process is, of course, preferred.

The nylon or polyolefin textile fibers generally used in the ply layers of the tire carcass may be in the form of either woven or non-woven filament or cords of either weftless or woven fabric. Nylon cords prepared by means of a mixture of polyhexamethylene adipamide (95–50%) and polyhexamethylene isophthalamide (5–50%) are particularly well suited to this purpose.

Various nylon and polyolefin tire cords and rubber adhesives may be used in making pneumatic tires by the process of this invention including those disclosed in U.S. Patent No. 2,932,901 and the aforesaid Belgian Patent No. 626,919. The process is particularly well suited for the manufacture of nylon passenger car tires of the type most commonly used at the present time because it does not require a radical change in the composition of the rubber or the method of manufacture.

While the invention has been described with particular reference to cords formed of nylon and polyolefin textile fibers, other types of fibers may also be used since the method and compositions of the invention are particularly effective wherever flatspotting is attributable to moisture.

Unless the context shows otherwise, wherever used herein the term "parts" means "parts by weight" and all percentages are by weight.

It will be understood that the above description is by way of illustration rather than limitation and that, in accordance with the provisions of the patent statutes, variations and modifications of the specific methods, compositions and articles described herein may be made without departing from the spirit of the invention.

Having described our invention, we claim:

1. A composition comprising a vulcanizable rubbery polymer containing, based on 100 parts by weight of said rubbery polymer, about 2 to 12 parts by weight of finely divided CaO and about 3 to 25 parts by weight of $Al_2O_3$, the amount of $Al_2O_3$ being in excess of the amount of CaO.

2. A composition as defined in claim 1 wherein said CaO is about 5 to 10 parts by weight and said $Al_2O_3$ is about 10 to 20 parts by weight.

3. A composition as defined in claim 1 wherein said CaO is about 7.5 parts by weight and said $Al_2O_3$ is about 15 parts by weight.

4. A vulcanizable carcass composition for pneumatic rubber tires containing per 100 parts by weight of rubbery polymer about 2 to 12 parts by weight of CaO and an amount of $Al_2O_3$ substantially greater than the amount of calcium oxide.

5. A rubberized laminate comprising one or more layers of textile tire cords coated with a rubber composition having dispersed therein, based on 100 parts by weight of rubber in said composition, about 2 to 12 parts by weight of finely divided CaO and about 3 to 25 parts by weight of $Al_2O_3$, the amount of $Al_2O_3$ being in excess of the amout of CaO.

6. A rubberized laminate comprising one or more layers of tire cords formed of textile fibers of the group consisting of nylon and polyolefins, said cords being coated with a rubber composition having dispersed therein, based on 100 parts by weight of rubber in said composition, about 2 to 12 parts by weight of finely divided CaO and about 3 to 25 parts by weight of $Al_2O_3$, the amount of $Al_2O_3$ being in excess of the amount of CaO.

7. A laminate as defined in claim 6 wherein said CaO is about 5 to 10 parts by weight and said $Al_2O_3$ is about 10 to 20 parts by weight.

8. In a pneumatic rubber tire having a tread portion, inextensible beads and a carcass portion, the improvement which comprises a carcass portion having one or more layers of tire cords formed of textile fibers of the group consisting of nylon and polyolefins, said cords being coated with a rubber composition having dispersed therein, based on 100 parts by weight of rubber, about 2 to 12 parts by weight of finely divided CaO and about 3 to 25 parts by weight of $Al_2O_3$, the amount of $Al_2O_3$ being in excess of the amount of CaO.

9. A pneumatic tire comprising a tread portion, inextensible beads, and a carcass portion having one or more layers of nylon cords coated with a rubber composition having dispersed therein, based on 100 parts by weight of rubber, about 2 to 12 parts by weight of finely divided CaO, and about 3 to 25 parts by weight of finely divided $Al_2O_3$, the amount of $Al_2O_3$ being in excess of the amount of CaO.

10. A pneumatic tire as defined in claim 9 wherein the amount of said CaO is about 5 to 10 parts by weight and the amount of said $Al_2O_3$ is about 10 to 20 parts by weight.

11. A pneumatic tire as defined in claim 9 wherein the amount of said CaO is about 7.5 parts by weight and the amount of said $Al_2O_3$ is about 15 parts by weight.

12. A pneumatic tire comprising a tread portion, inextensible beads, and a carcass portion having one or more layers of polyolefin cords coated with a rubber composition having dispersed therein, based on 100 parts by weight of rubber, about 2 to 12 parts by weight of finely divided CaO, and about 3 to 25 parts by weight of finely divided $Al_2O_3$, the amount of $Al_2O_3$ being in excess of the amount of CaO.

13. A pneumatic tire as defined in claim 12 wherein the amount of said CaO is about 5 to 10 parts by weight and the amount of said $Al_2O_3$ is about 10 to 20 parts by weight.

14. A pneumatic tire as defined in claim 12 wherein the amount of said CaO is about 7.5 parts by weight and the amount of said $Al_2O_3$ is about 15 parts by weight.

15. In a method of making a tire wherein tread stock, inextensible beads and a carcass formed of ply layers are assembled to form an uncured tire which is then expanded and cured in a vulcanizing mold, the improvement comprising the steps of:
  (a) preparing a vulcanizable ply stock composition comprising rubber having dispersed therein, based on about 100 parts by weight of said rubber, about 2 to 12 parts by weight of finely divided CaO and about 3 to 25 parts by weight of $Al_2O_3$, the amount of $Al_2O_3$ being in excess of the amount of CaO,
  (b) coating a layer of tire cords, formed from textile fibers of the group consisting of nylon and polyolefins, with said composition, and
  (c) forming said tire carcass of one or more plies of said rubberized cords.

16. In a method of making a tire wherein tread stock, inextensible beads and a carcass formed of ply layers are assembled to form an uncured tire which is expanded and cured in a vulcanizing mold, the improvement comprising the steps of:
  (a) preparing a vulcanizable ply stock composition comprising rubber having dispersed therein, based on about 100 parts by weight of said rubber, about 3 to 16 parts by weight of a suspension of finely divided CaO in an oil that is compatible with said rubber, and about 3 to 25 parts by weight of $Al_2O_3$, the amount of $Al_2O_3$ being in excess of the amount of CaO,
  (b) coating a layer of tire cords formed from textile fibers of the group consisting of nylon and polyolefins with said composition, and
  (c) forming said tire carcass of one or more plies of said rubberized cords.

17. A method as defined in claim 16 wherein said finely divided CaO is in suspension in an aromatic oil in a weight ratio of about 3 to 1 respectively.

References Cited by the Examiner
UNITED STATES PATENTS

| | | | |
|---|---|---|---|
| 2,561,215 | 7/1951 | Mighton | 260—845 X |
| 2,676,636 | 4/1954 | Sarbach | 161—239 X |
| 2,828,272 | 3/1958 | Ullrich | 260—41.5 X |
| 2,937,230 | 5/1960 | Rogers | 161—247 X |
| 2,964,457 | 12/1960 | Kraus | 204—154 |
| 3,055,736 | 9/1962 | Becue | 260—41.5 X |
| 3,091,560 | 5/1963 | Miller et al. | 161—227 |
| 3,220,456 | 11/1965 | Ahles | 152—330 |

EARL M. BERGERT, *Primary Examiner.*

HAROLD ANSHER, *Examiner.*

Disclaimer 3,302,680.—*Frank C. Rote* and *Rollin H. Spelman*, Akron, Ohio. LOW MOISTURE CONTENT PNEUMATIC TIRE CARCASS RUBBERIZED LAMINATES AND VULCANIZABLE RUBBERY POLYMERS USED THEREIN. Patent dated Feb. 7, 1967. Disclaimer filed Feb. 24, 1969, by the assignee, *The General Tire & Rubber Company*.

Hereby enters this disclaimer to claims 1, 2, 3, 4, 5, 6, 7, 8, 9, 10, 11, 15, 16 and 17 of said patent.

[*Official Gazette August 12, 1969.*]